United States Patent
Li

(10) Patent No.: US 8,320,412 B2
(45) Date of Patent: Nov. 27, 2012

(54) METHOD, DEVICE AND SYSTEM FOR MANAGING TIMESTAMP

(75) Inventor: Beijian Li, Shenzen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 412 days.

(21) Appl. No.: 12/638,612

(22) Filed: Dec. 15, 2009

(65) Prior Publication Data

US 2010/0183035 A1 Jul. 22, 2010

(30) Foreign Application Priority Data

Jan. 16, 2009 (CN) .......................... 2009 1 0036709

(51) Int. Cl.
*H04J 3/06* (2006.01)
(52) U.S. Cl. ...................................................... 370/503
(58) Field of Classification Search ........................ None
See application file for complete search history.

(56) References Cited

U.S. PATENT DOCUMENTS

| | | | | |
|---|---|---|---|---|
| 8,036,202 B2* | 10/2011 | Biederman et al. | ........... | 370/347 |
| 2002/0065940 A1* | 5/2002 | Suzuki et al. | ................. | 709/248 |
| 2002/0073228 A1* | 6/2002 | Cognet et al. | ................. | 709/236 |
| 2005/0027760 A1* | 2/2005 | Knobe et al. | .................. | 707/206 |
| 2006/0245454 A1* | 11/2006 | Balasubramanian et al. | | 370/509 |
| 2007/0106912 A1* | 5/2007 | Tanaka | .......................... | 713/193 |
| 2007/0162758 A1* | 7/2007 | Inoue | ............................ | 713/178 |
| 2007/0214363 A1* | 9/2007 | Ishii | .............................. | 713/178 |
| 2010/0138588 A1* | 6/2010 | Lin et al. | ....................... | 711/103 |

* cited by examiner

*Primary Examiner* — Min Jung
(74) *Attorney, Agent, or Firm* — Leydig, Voit & Mayer, Ltd.

(57) ABSTRACT

In an embodiment of the present disclosure, a method of managing IEEE1588 timestamps is disclosed. The method includes: receiving a data frame and a storage address of synchronized timestamp controlling information; obtaining the timestamp controlling information for the data frame to control the timestamp processing according to the storage address; obtaining a timestamp while receiving the data frame, obtaining a required timestamp according to the timestamp and adding the required timestamp into the data frame according to the timestamp controlling information; and sending the data frame added with the timestamp. A downstream timestamp managing module, an upstream timestamp managing module, and relevant timestamp managing systems are also disclosed in an embodiment of the present disclosure. The embodiment can conveniently and accurately add or obtain IEEE1588 timestamp into or from 10 Gbit/s Ethernet and simultaneously save resources and guarantee the synchronization of timestamp and data.

18 Claims, 7 Drawing Sheets

METHOD, DEVICE AND SYSTEM FOR MANAGING TIMESTAMP

CROSS-REFERENCE TO RELATED APPLICATION

This application claims priority to Chinese Patent Application No. 200910036709.6, filed on Jan. 16, 2009, which is hereby incorporated by reference in its entirety.

FIELD OF THE DISCLOSURE

The present disclosure relates to Ethernet technology, and in particular, to a method, device and system for managing timestamps.

BACKGROUND

The IEEE1588 protocol was initially used for the description of the accurate time synchronization protocol in network measurement and control system and has been widely applied in the Ethernet field with the development of Ethernet technology.

In prior technology, it is possible to accurately process IEEE1588 protocol in 100 Gbit/s Ethernet. The method includes adding the timestamp of the time into downstream Ethernet frame, or marking the received timestamp of the frame in response to receiving the upstream Ethernet frame receives, under the control of relevant controlling signals of the IEEE1588 protocol when the Ethernet frame is being transmitted through PHY layer (Physical Layer).

Based on the description of IEEE1588 protocol, the closer to PHY layer the position where the timestamp is added to or obtained from the data frame, the more accurate the position is. Because a farther location may cause jitters due to frequency difference or FIFO on data path and the closer location may more accurately show the actual time when the frame is received and transmitted.

FIG. 1 shows a connection of MAC and PCS (Physical coding sublayer) in 10 Gbit/s Ethernet of prior technology. In the downstream direction, MAC (Media Access Control) sublayer 2 transmits the data to PCS 1 where the data is coded and then transmitted to 64/16 transformer 3; in the downstream direction, PCS 1 comprises at least an asynchronous FIFO 12 and a PCS transmitting module (PCS TX) 14 which at least comprises a 64/66B encoding module and a scrambling module. In the upstream direction, 16/64 transformer 4 transmits the data to PCS 1 where the data is decoded and then transmitted to MAC sublayer 2; in the upstream direction, PCS 1 at least comprises an asynchronous FIFO 16 and a PCS receiving module (PCS RX) 18 which at least comprises a 64/66B decoding module and a descrambling module. It is obvious that the Ethernet has evolved to 10 Gbit/s and includes a range of features not in the 100 Mbit/s Ethernet: for example, 10 Gbit/s Ethernet MAC sublayer provides dynamic frame clearance adjustment. It also supports asynchronous FIFO for removing frequency differences between the MAC sublayer and the 10 Gbit/s Ethernet PCS, and the PCS (generally 10 GBASE-R PCS) clock has nicks (e.g. 1 invalid clock cycle every 33 clock cycles). Besides, difference in 10 Gbit/s and 100 Mbit/s Ethernet can also be found in other disclosed documents. The inventor has also realized that the prior technology cannot accurately manage (adding or obtaining) timestamp in 10 Gbit/s Ethernet.

SUMMARY

A method, device and system of managing IEEE1588 timestamp in 10 Gbit/s Ethernet are provided in an embodiment of the present disclosure, which may accurately add or obtain IEEE1588 timestamp into or from 10 Gbit/s Ethernet.

A method of managing IEEE1588 timestamp is provided in an embodiment of the present disclosure. The method includes:

receiving the data frame and synchronized storage address of timestamp controlling information;

obtaining the timestamp controlling information for the data frame to control the timestamp processing according to the storage address; and obtaining a timestamp while receiving the data frame, obtaining a required timestamp according to the timestamp, and adding the required timestamp into the data frame according to the timestamp controlling information.

A method of managing IEEE1588 timestamp is provided in an embodiment of the present disclosure. The method includes:

receiving the data frame;

obtaining and adjusting the timestamp while receiving the data frame, and storing the adjusted timestamp; and synchronously transmitting the data frame and the storage address which stores the adjusted timestamp.

A timestamp managing system provided in an embodiment of the present disclosure comprises an asynchronous FIFO. The system further includes a downstream timestamp managing module, adapted to receive the data frame from the asynchronous FIFO and the storage address of the synchronized timestamp controlling information, obtain the timestamp controlling information for the data frame to control the timestamp processing according to the storage address, obtain a timestamp while receiving the data frame, obtain a required timestamp according to the timestamp, and add the required timestamp into the data frame according to the timestamp controlling information.

A timestamp managing system provided in an embodiment of the present disclosure comprises an asynchronous FIFO. The system further includes an upstream timestamp managing module, adapted to receive data frame, obtain and adjust the timestamp while receiving the data frame, store the adjusted timestamp, and synchronously transmit the data frame and the storage address which stores the adjusted timestamp.

The method, device and system of managing timestamp provided in an embodiment of the present disclosure may utilize the timestamp controlling information to conveniently and accurately add the timestamp while transmitting (or receiving) the data frame into or obtain from the data frame. While transmitting a data frame, it is not necessary to transmit the timestamp controlling information but the storage address of the timestamp controlling information, which reduces the resources for synchronously penetrating MAC sublayer. The timestamp controlling information may be obtained by using the storage address and the management of timestamp by using data frames is possible.

BRIEF DESCRIPTION OF THE DRAWINGS

For a clearer description of the embodiments of the present disclosure or technical proposals of current technologies, a brief description of the drawings required for the embodiments or current technical descriptions are given below. It is apparent that the drawings in the following descriptions are just some embodiments of the disclosure and those skilled in the art can make other drawings based on these without departing from the spirit and scope of the disclosure.

DETAILED DESCRIPTION

The technical proposals in an embodiment of the present disclosure are clearly and completely described as follows based on the drawings in the embodiments of the present disclosure. It is apparent that the described embodiments are just parts of the present disclosure, not all embodiments. Those skilled in the art can make other embodiments without departing from the spirit and scope of the disclosure.

Figure 1:
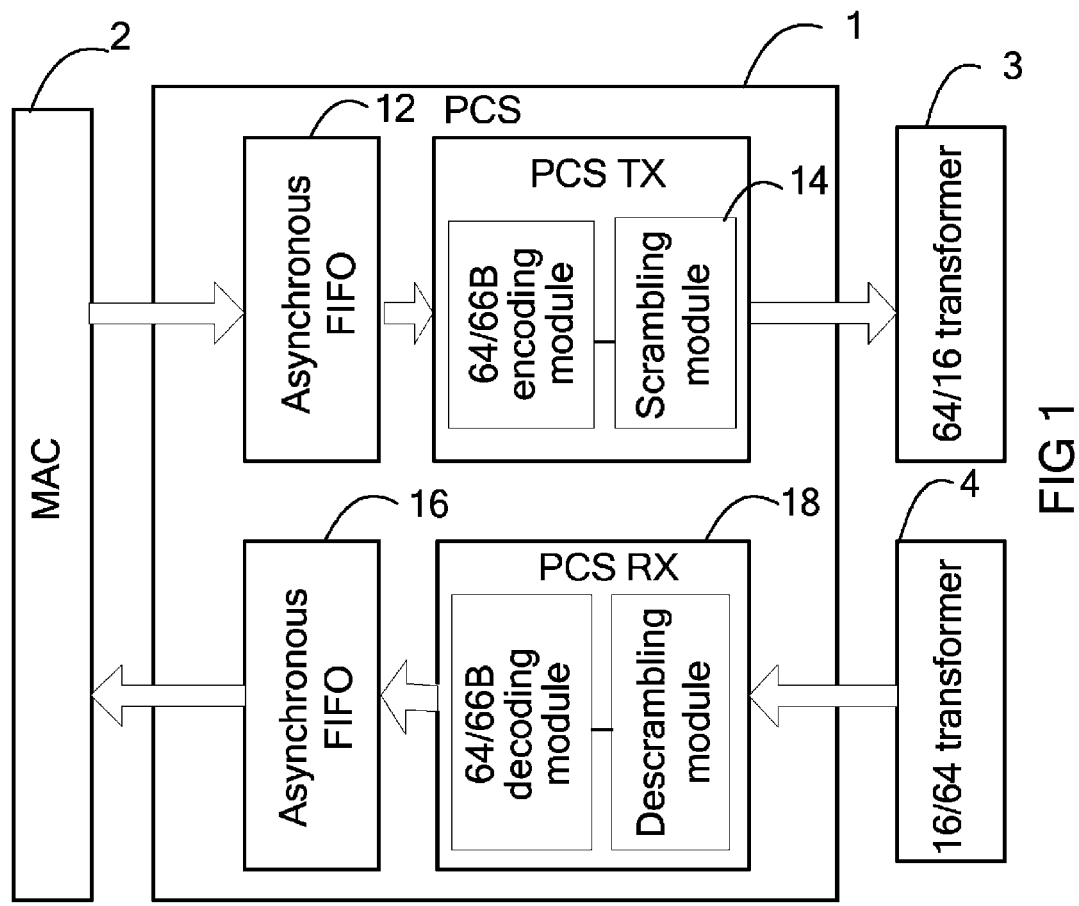
FIG. 1 is a connection schematic of MAC and PCS in 10 Gbit/s Ethernet of the prior technology.
Figure 2:
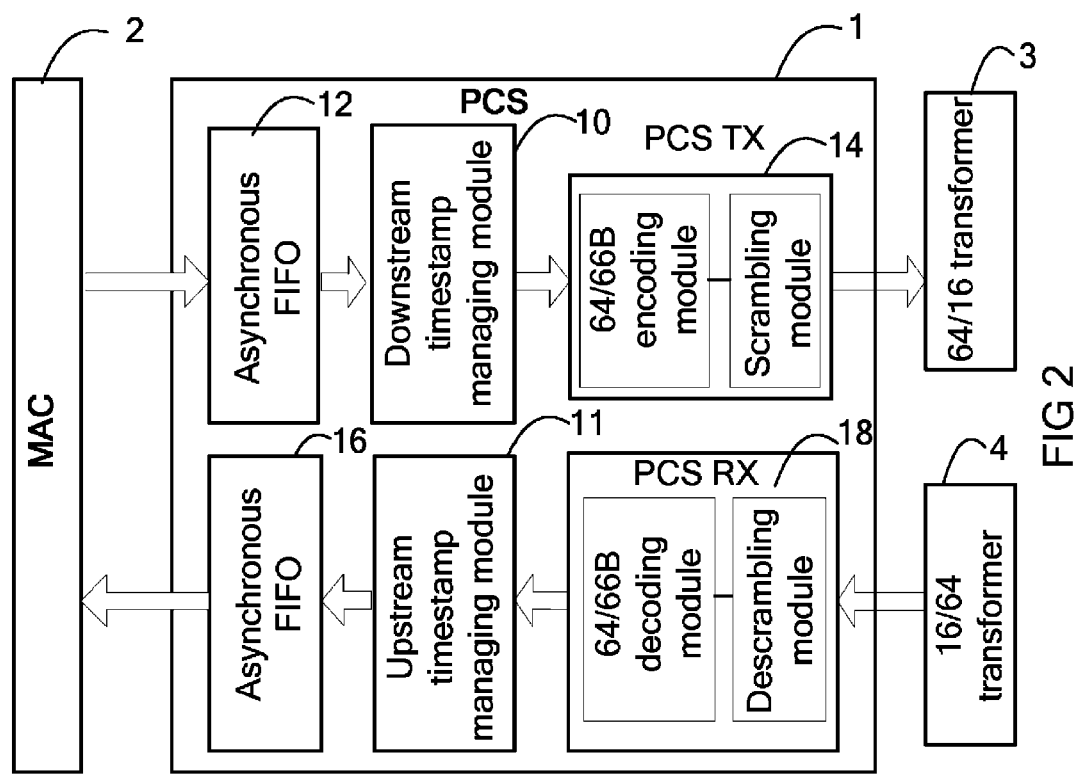
FIG. 2 shows a structure of a timestamp managing system in an embodiment of the present disclosure.

FIG. 2 shows a structure of a timestamp managing system in an embodiment of the present disclosure. In one embodiment of the present disclosure, in the downstream direction, the timestamp adjusting system includes an asynchronous FIFO 12 in PCS 1 and a PCS transmitting module (PCS TX) 14 which at least includes a 64/66B encoding module. The timestamp adjusting system further includes a downstream timestamp managing module 10 configured between the asynchronous FIFO 12 in PCS 1 and 64/66B encoding module, and the downstream timestamp managing module 10 is adapted to add timestamp while transmitting on the transmitting data frame in the downstream direction. Specifically, the downstream timestamp managing module 10 may be adapted to receive the data frame from the asynchronous FIFO and the storage address of the synchronized timestamp controlling information, obtain the timestamp controlling information for the data frame to control the timestamp processing according to the storage address, obtain a timestamp while receiving the data frame, obtain a required timestamp according to the timestamp, and add the required timestamp into the data frame according to the timestamp controlling information. In the upstream direction, the timestamp adjusting system includes an asynchronous FIFO in PCS 1 and a PCS receiving module (PCS RX) 18 which at least includes a 64/66B decoding module. The timestamp adjusting system further includes an upstream timestamp managing module 11 configured between 64/66B decoding module in PCS 1 and asynchronous FIFO 16 and adapted to obtain the timestamp while receiving the data frame in the upstream direction. Specifically, the upstream timestamp managing module 11 may be adapted to receive data frame, obtain and adjust the timestamp information while receiving the data frame, store the adjusted timestamp information, and synchronously transmit the data frame and the storage address of the adjusted timestamp. In one of the embodiments, the clock of MAC sublayer 2 runs at 156.25 MHz; the clock of downstream PCS 1 runs at 161.133 MHz. It is understandable that both MAC sublayer 2 and PCS 1 can work in the same clock domain of 156.25 MHz, but the transformation of different clock frequencies is performed at the interface between PCS 1 and external high-speed modules. On that condition, the times- tamp does not need adjusting. It is described below based on different clock frequencies of MAC sublayer 2 and PCS 1.

A timestamp adjusting system is provided in an embodiment of the present disclosure. While transmitting data frame, it is not necessary to transmit the timestamp controlling information but the storage address of the timestamp controlling information, which reduces the resources for synchronously penetrating MAC sublayer 2. The timestamp controlling information may be obtained by using the storage address and the management of IEEE1588 timestamp by using data frames is possible.

Based on the drawings below, a downstream timestamp managing module 10 and upstream timestamp managing module 11 are described in an embodiment of the present disclosure.

Figure 3:
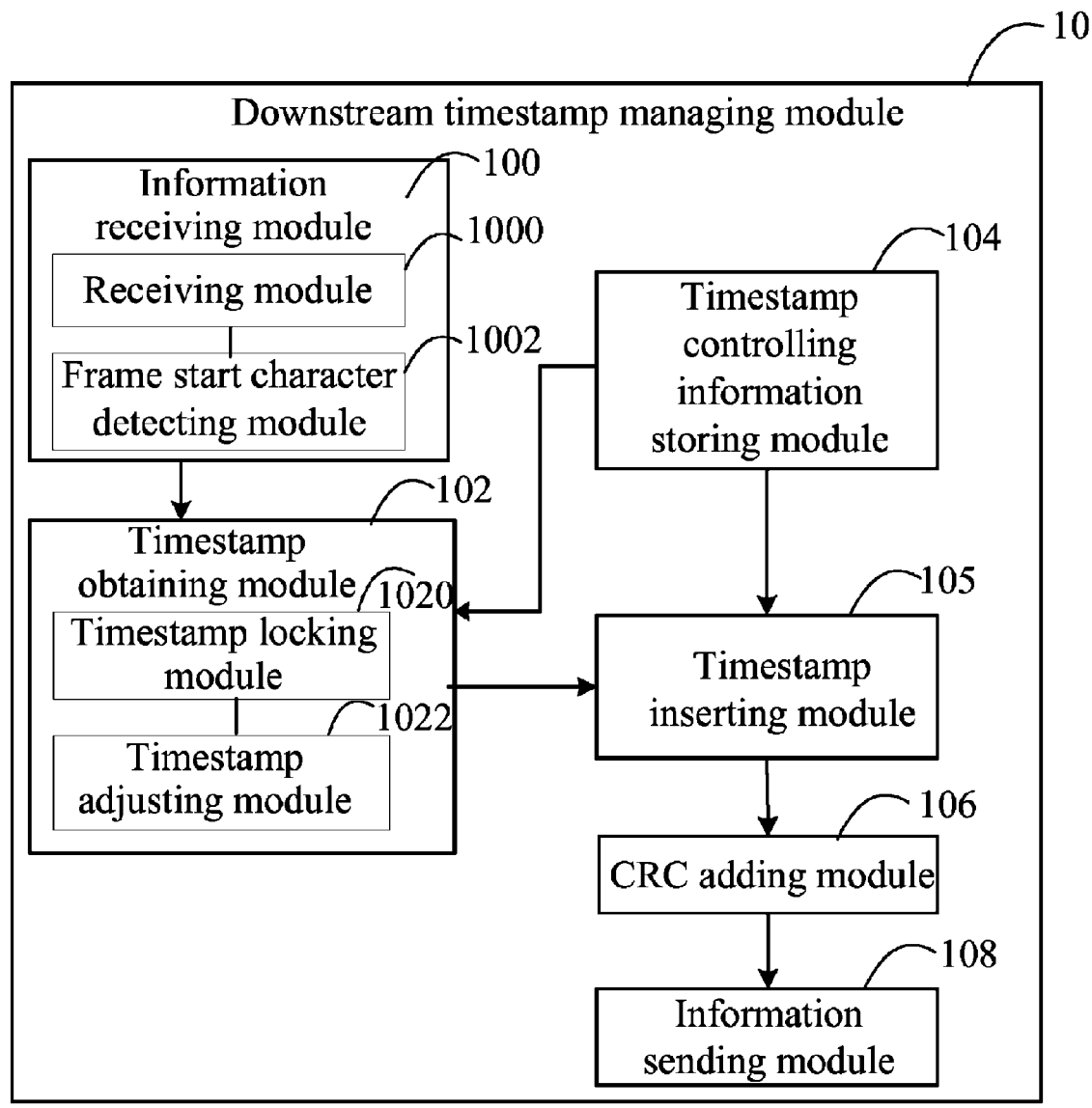
FIG. 3 shows a structure of a downstream timestamp managing module in an embodiment of the present disclosure.

FIG. 3 shows a structure of a downstream timestamp managing module 10 in an embodiment of the present disclosure. The downstream timestamp managing module 10 is adapted to add IEEE1588 timestamp for downstream transmitting data frame in 10 Gbit/s Ethernet. Specifically, the downstream timestamp managing module 10 includes:

an information receiving module 100, adapted to receive the data frame and synchronized storage address of the timestamp controlling information, and further, to detect the start character of the data frame being a downstream transmitting data frame from the MAC; wherein specifically, in one embodiment, the downstream transmitting data frame may be txdata[63:0] and txlane[7:0], while the storage address of the timestamp controlling information may be txtimes_addr[3:0];

a timestamp controlling information storing module 104, adapted to store the timestamp controlling information used for controlling the timestamp processing for the data frame; wherein the timestamp controlling information may be adding timestamp indication information for indicating whether the timestamp is added, adding address indication information for indicating the adding address, adjustment indication information for indicating whether the adjustment is needed, adjustment value indication information for indicating the adjustment value, data frame type indication information for indicating the type of data frame, and text-back indication information for indicating whether the text-back of required timestamp is needed; in one embodiment, it can be ctrl0, ctrl1, ctrl2, vlan_flag[1:0], correction vld, correction[15:0], and tx_back_data_vld etc;

a timestamp obtaining module 102, adapted to obtain the timestamp while receiving the data frame and obtain a required timestamp according to the timestamp; where, in an embodiment of the present disclosure, the timestamp may be generated by a local clock, for example, in a specific embodiment, the clock is clk_200m and frequency is 200 MHz. Based on IEEE1588 protocol, timestamp signal consists of 80 bit data and the timestamp is represented by time_stamp[79:0] and its relevant time_stamp_ns[41:0]; the timestamp obtaining module may obtain the current timestamp information from the clock; and a timestamp inserting module 105, adapted to obtain the timestamp controlling information in the relevant timestamp controlling information storing module 104 according to the storage address of the timestamp controlling information and add the timestamp required by the timestamp obtaining module 102 into the data frame.

Specifically, the downstream timestamp managing module 10 further includes:

a CRC adding module 106, connected with the timestamp inserting module 105 and adapted to calculate and generate a Cyclic Redundant Code (CRC) for the data frame after adding the timestamp and adding the CRC to the end of the data frame; and an information sending module 108, adapted to send the data frame added with CRC to 64/66B encoder in PCS; wherein specifically, the foregoing information may be sent through interfaces such as tx_enc_data[63:0] or tx_enc_lane [7:0].

Figure 4:
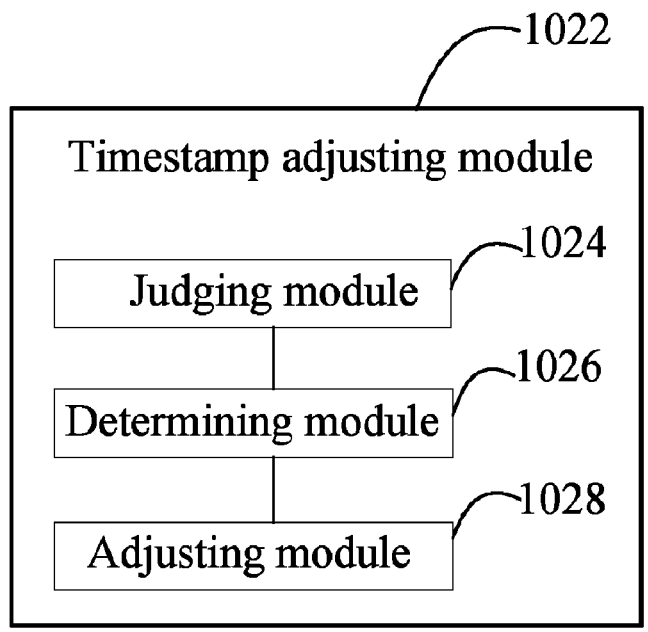
FIG. 4 shows a structure of a timestamp managing module in FIG. 3.

The information receiving module 100 further includes:

a receiving module 1000, adapted to receive the data frame and synchronized storage address of the timestamp controlling information; and a frame start character detecting module 1002, adapted to detect the address of the start character of the received data frame;

As shown in FIG. 4, the timestamp obtaining module 102 in the embodiment further includes:

a timestamp locking module 1020, adapted to lock the current timestamp information when the frame start character detecting module 1002 detects the start character of the data frame; and a timestamp adjusting module 1022, adapted to judge whether adjustment for the locked current timestamp information is needed, adjust the current timestamp information if needed, and obtain the required timestamp required to be added.

Specifically, the timestamp adjusting module 1022 further includes:

a judging module 1024, adapted to judge the address of clock beats sent by the PCS which sends data frame; where, for example, in one embodiment, 1 invalid beat out of 33 beats resides inside the PCS, which may cause jitters. To remove jitters, the address (from 0 to 32) of clock beats sent by the PCS may be checked while the timestamp is obtained, and the required beats (e.g. 21) from obtaining the timestamp till sending to the 64/66B module for the data stream are to be checked; thus, 32 valid clock cycles (32 clock cycles continuously from the start of the first valid clock cycle after 1 invalid clock cycle) are divided into 32 ranges, each of which need be adjusted; therefore, the adjustment value increases linearly, the first valid clock cycle carries the minimum adjustment value, and the $32^{nd}$ valid clock cycle carries the maximum value, which is a 161.133 MHz clock cycle;

a determining module 1026, adapted to determine (obtain) an adjustment value relevant to the data frame according to the address of clock beats judged by the judging module 1024; and an adjusting module 1028, adapted to adjust the locked current timestamp information according to the adjustment value determined by the determining module 1026 and obtain the timestamp required to be added; where, for example, in one embodiment, the timestamp required to be added is obtained by adding the adjustment value with the locked current timestamp information.

Specifically, the meaning of each interface signal in the downstream timestamp managing module 10 provided in an embodiment of the present disclosure is described in Table 1:

TABLE 1

| Signal | Length (Bit) | Features | Description |
| --- | --- | --- | --- |
| time_stamp[79:0] | 80 | Input (I) | timestamp signal, clk_200m clock domain signal |
| time_stamp_ns[41:0] | 42 | Input (I) | correction timestamp signal, clk_200m clock domain signal |
| ctrl0 | 1 | Input (I) | 1 indicates the necessity of adding the timestamp obtained into relevant sending frame; 0 indicates no necessity. |
| ctrl1 | 1 | Input (I) | 1 indicates the necessity of texting back the obtained timestamp, texting-back signal is tx_time_vld, tx_message_type, tx_source_port_id, tx_sequenceied, tx_time_stamp, tx_correct_vld; 0 indicates no necessity. |
| ctrl2[n:0] | ≧2 | Input (I) | This signal represents the address of inserting timestamp in the present frame, e.g. 2'b00: reserved; 2'b01: inserted in correction domain of header; 2'b10: inserted in 10 bytes (origin Timestamp domain) behind header; 2'b11: reserved. |
| correction[15:0] | 16 | Input (I) | value required to be added to the timestamp; 4 beats valid; the $1^{st}$ beat: correction value [63:48]; the $2^{nd}$ beat: correction value [47:32]; the $3^{rd}$ beat: correction value [31:16]; the 4 beat: correction value [15:0]. |
| correction_vld | 1 | Input (I) | correction valid indication; 1 represents the value required to be added to the timestamp; 0 represents no necessity of adding; this signal needs at least 4 valid beats to keep consistent with the relevant value. |
| tx_back_data_vld | 1 | Output (O) | the sending texting-back data valid indication; 1 indicates valid; if valid, there are 5 continuous beats. |
| tx_back_data[35:0] | 36 | Output (O) | sending the texting-back data; valid during the valid duration of tx_back_vld; the $1^{st}$ beat: {tx_message_type[3:0], tx_sequenceid[15:0], tx_source_port_id[79:64]}; the $2^{nd}$ beat: {tx_source_port_id[63:28]}; the $3^{rd}$ beat: {tx_source_port_id[27:0], tx_time_stamp[79:72]}; the $4^{th}$ beat: {tx_time_stamp[71:36]}; the $5^{th}$ beat: {tx_time_stamp[35:0]}. wherein tx_message type[3:0] represents the type of texting-back message; tx_source_port_id[79:0] |

TABLE 1-continued

| Signal | Length (Bit) | Features | Description |
| --- | --- | --- | --- |
| | | | represents the ID of source port of texting-back message; tx_sequenceid[15:0] represents the sequence number of message while texting back; tx_time_stamp[79:0] represents the timestamp signal while texting back. |
| tx_back_correct_vld | 1 | Output (O) | The signal indicates whether PCS jitter is added while texting back. 1 indicates Yes; 0 indicates No. |

A downstream timestamp managing module 10 is provided in an embodiment of the present disclosure. While receiving a data frame, it is not necessary for the information receiving module 100 to receive timestamp controlling information, but the storage address of the synchronized timestamp controlling information, which reduces the resources for synchronously penetrating MAC sublayer 2. The timestamp controlling information may be obtained by using the storage address and the management of IEEE1588 timestamp by using data frames is possible.

Figure 5:
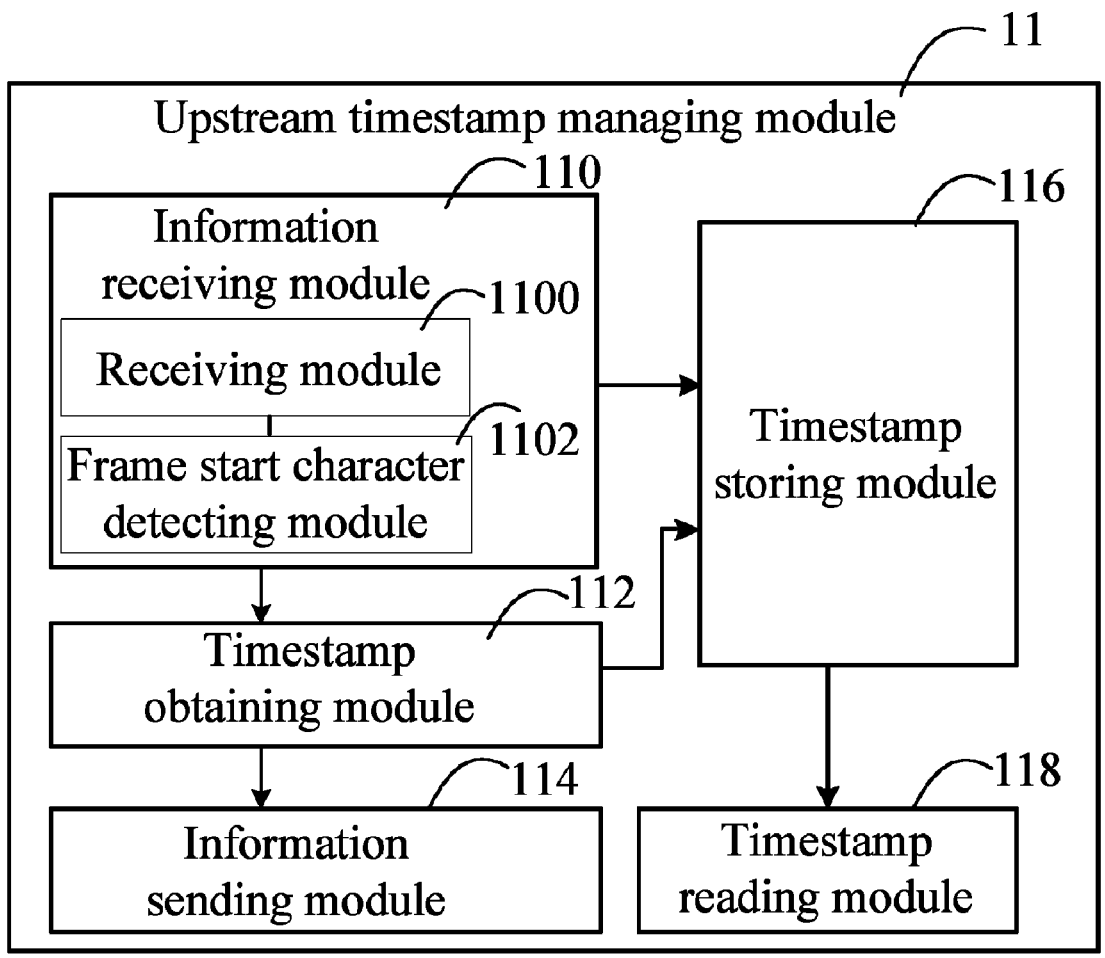
FIG. 5 shows a structure of a upstream timestamp managing module in an embodiment of the present disclosure.

FIG. 5 shows a structure of an upstream timestamp managing module 11 provided in an embodiment of the present disclosure. The upstream timestamp managing module 11 is adapted to obtain IEEE1588 timestamp for the received upstream data frame in 10 Gbit/s Ethernet. Specifically, the upstream timestamp managing module 11 includes:

an information receiving module 110, adapted to receive data frames which, in the embodiments of the present disclosure, may be the data frame from the 64/66B decoder in the PCS; further, to detect the frame start character, and receive the data frame through the interface rx_raw[71:0] in an embodiment, including 64 bit data and 8 bit controlling information;

a timestamp obtaining module 112, adapted to obtain the timestamp while receiving the data frame; wherein specifically, the timestamp may be generated by a local clock clk_200m and adjusted relevantly to get the adjusted timestamp;

a timestamp storing module 116, adapted to store the adjusted timestamp from the timestamp obtaining module; and an information transmitting module 114, adapted to synchronously transmit the data frame and the storage address for storing the timestamp in the timestamp storing module 116, and in an embodiment of the present disclosure, to an asynchronous FIFO in PCS.

Further, the upstream timestamp managing module includes:

a timestamp reading module, adapted to read the relevant timestamp of the data frame stored in the timestamp storing module 116 according to the storing address.

The information receiving module 110 further includes:

a receiving module 1100, adapted to receive data frames which, in an embodiment of the present disclosure, may be the data frame from the 64/66B decoder in the PCS; and a frame start character detecting module 1102, adapted to detect the address of the start character of the received data frame.

Figure 6:
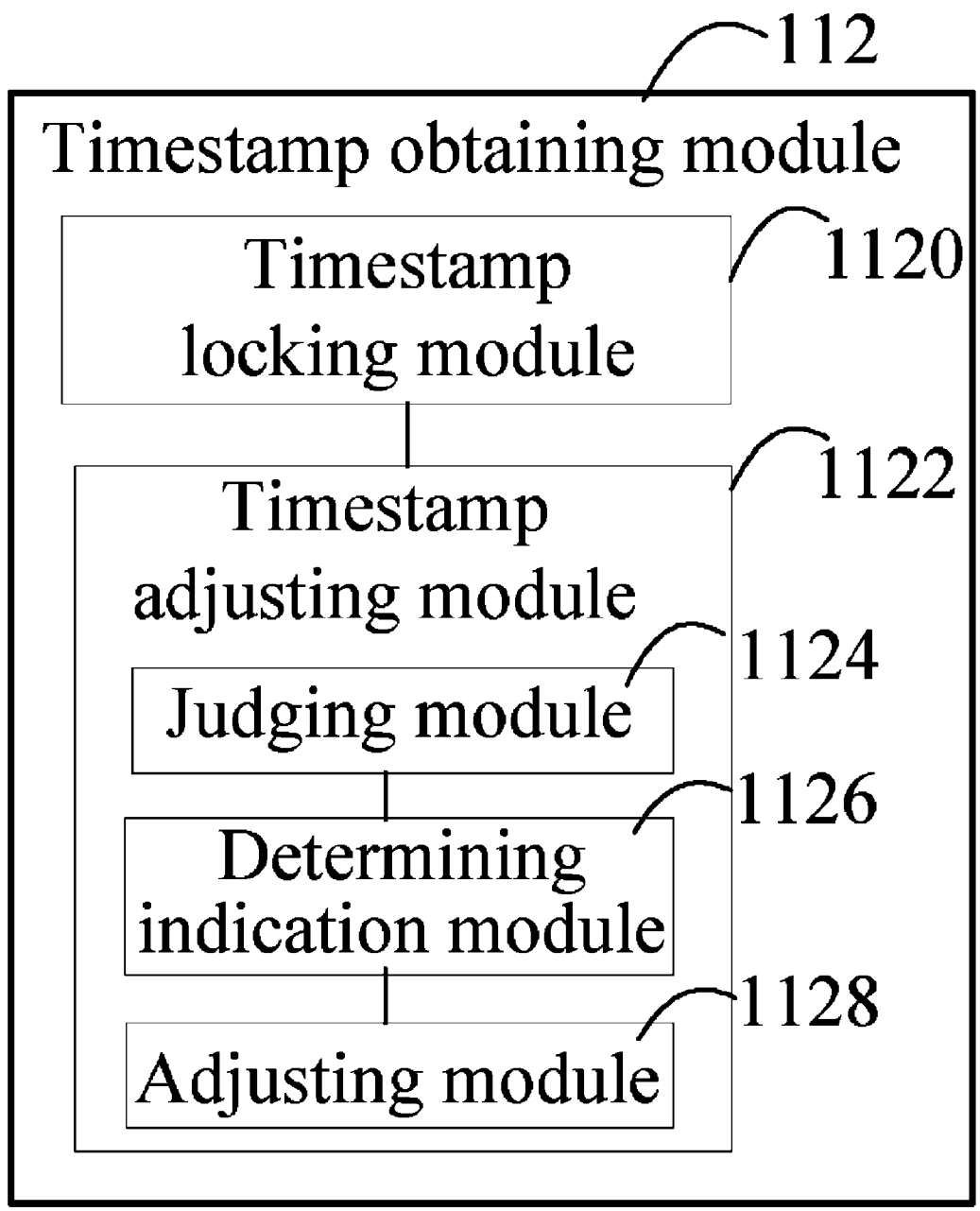
FIG. 6 shows a structure of a timestamp obtaining module in FIG. 5.

As shown in FIG. 6, the timestamp obtaining module 112 provided in an embodiment of the present disclosure further includes:

a timestamp locking module 1120, which locks the current timestamp information when the frame start character detecting module 1102 detects the start character of the data frame; and a timestamp adjusting module 1122, adapted to adjust the current timestamp locked by the timestamp locking module, wherein specifically, the timestamp adjusting module 1122 further includes:

a judging module 1124, adapted to judge the address of the clock beats while judging the start character of the data frame;

a determining module 1126, adapted to determine the adjusting information of the data frame according to the address of the clock beats judged by the judging module 1124, wherein specifically, the determining module 1126 may divide 32 valid clock cycles (32 clock cycles continuously from the start of the first valid clock cycle after 1 invalid clock cycle) into 32 ranges, each of which may be adjusted; the adjustment value increases linearly; the first valid clock cycle has the minimum adjustment value and the $32^{nd}$ valid clock cycle carries the maximum value which is a 161.133 MHz clock cycle; and an adjusting module 1128, adapted to adjust the locked current timestamp to obtain an adjusted timestamp according to the adjusting information determined by the determining module 1126.

Specifically, the meaning of each interface signal in the upstream timestamp managing module 11 provided in an embodiment of the present disclosure is described in Table 2:

TABLE 2

| Signal | Length(Bit) | Features | Description |
| --- | --- | --- | --- |
| time_stamp[79:0] | 80 | Input (I) | timestamp signal, clk_200m clock domain signal |
| rx_time_rd | 1 | Input (I) | receiving timestamp reading signal |
| rx_time_rd_addr[2:0] | 3 | Input (I) | receiving timestamp reading address |
| rx_time_stamp[15:0] | 16 | Output (O) | timestamp receiving information of the receiving frame, valid only two beats after the rx_time_rd is valid, 5 continuous beats; the $1^{st}$ beat: receiving timestamp [79:64]; the $2^{nd}$ beat: receiving timestamp [63:48]; the $3^{rd}$ beat: receiving timestamp [47:32]; the $4^{th}$ beat: receiving timestamp [31:16]; the $5^{th}$ beat: receiving timestamp [15:0]. |

An upstream timestamp managing module 11 is provided in an embodiment of the present disclosure. While transmitting data frame, it is not necessary for the information transmitting module 114 to transmit timestamp controlling information, but the storage address for storing the timestamp in the timestamp storing module 116, which reduces the resources for synchronously penetrating MAC sublayer 2. The timestamp controlling information may be obtained by using the storage address and the management of IEEE1588 timestamp by using data frames is possible.

Below is a description of a flowchart of a method of managing IEEE1588 timestamp in 10 Gbit/s Ethernet in an embodiment of the present disclosure. It may be understood that such details therein are described in the foregoing figures from FIG. 2 to FIG. 6.

Figure 7:
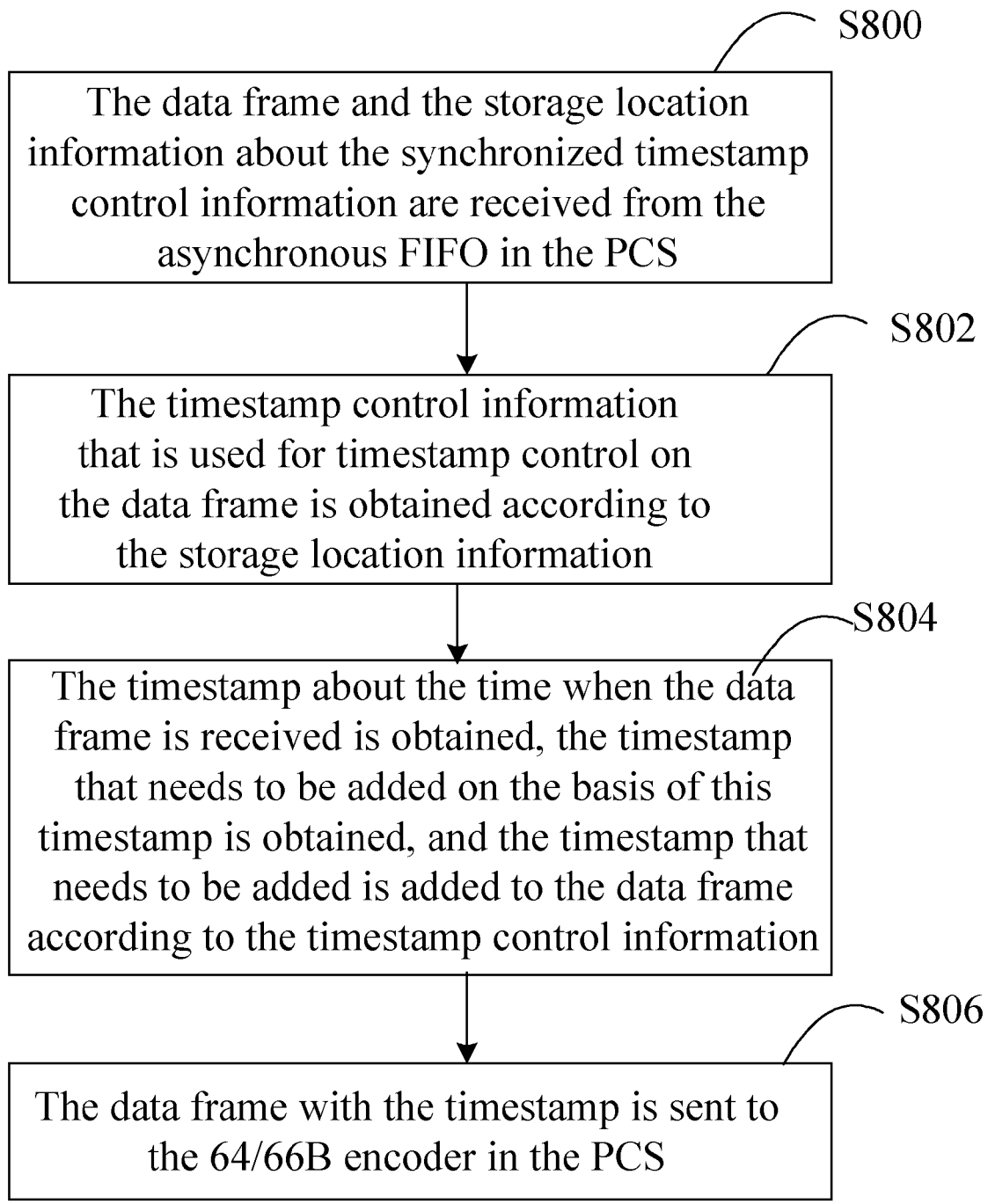
FIG. 7 shows a flowchart of a method of managing IEEE1588 timestamp in an embodiment of the present disclosure.

FIG. 7 is a flowchart of a method of managing IEEE1588 timestamp in an embodiment of the present disclosure. The flowchart shows that it is possible to add IEEE1588 timestamp into downstream data frame in 10 Gbit/s Ethernet. Specifically, the method includes:

Block S800: Receiving the data frame and synchronized storage address of the timestamp controlling information; in this embodiment, receiving from the asynchronous FIFO of the PCS, wherein the timestamp controlling information which may be stored in a timestamp controlling information storing module (e.g. RAM) may be the adding timestamp indication information for confirming the adding of timestamp, adding address indication information for indicating the adding address, adjustment indication information for indicating whether the adjustment is needed, adjustment value indication information for indicating the adjustment value, data frame type indication information for indicating the type of data frame, and text-back indication information for indicating whether the text-back of required timestamp is needed; and the data frame enters the MAC and penetrates the asynchronous FIFO synchronously with the storage address of the timestamp controlling information.

Block S802: Obtaining the timestamp controlling information for the data frame to control timestamp according to the storage address; specifically, utilizing a controlling signal (e.g. the biggest among frame start characters) to determine the necessity of reading timestamp controlling information once judging the start character of the data frame; if required, reading the timestamp controlling information of the data frame prestored at the storage address according to the storage address; where, as it shows, it is not necessary for the timestamp controlling information to penetrate the MAC sublayer but the storage address of the timestamp controlling information, which may save some resources.

Block S804: Obtaining a timestamp while receiving a data frame, obtaining the required timestamp according to the timestamp, and adding the required timestamp into the data frame according to the timestamp controlling information; including specifically:

locking the current timestamp by using a local clock (e.g. clk_200m clock) when detecting the start character of the data frame;

judging the necessity of adjusting the locked current timestamp according to the value of the timestamp controlling information and obtaining the required timestamp; where, in an embodiment, if the adjustment is required, the adjustment is performed as follows: judging the address of the clock beats sent by the PCS which sends the data frame while obtaining the locked current timestamp; dividing 32 valid clock cycles (32 clock cycles continuously from the start of the first valid clock cycle after 1 invalid clock cycle) into 32 ranges, each of which may be adjusted; the adjustment value increases linearly; the first valid clock cycle has the minimum adjustment value and the 32$^{nd}$ valid clock cycle carries the maximum value which is a 161.133 MHz clock cycle;

obtaining the relevant adjustment value of the range where the clock beats are;

obtaining the required timestamp by adding the adjustment value with the locked current timestamp;

taking the locked current timestamp as the required one if adjustment is not required; and adding the required timestamp into relevant address (e.g. header, 10 bits behind the header, from the 30$^{th}$ bit in frame etc.) of the data frame according to the adding address indicated in the timestamp controlling information after obtaining the required timestamp.

After this block, it further includes:

calculating and generating CRC for the data frame added with the timestamp and adding CRC to the end of the data frame.

Block S806: Sending the data frame added with the required timestamp which, in this embodiment, is sent to 64/66B encoder in PCS.

Step S806 is optional in the method of managing IEEE1558 timestamp in an embodiment of the present disclosure and not required in other embodiments as some ordinary technologies in this field are understandable.

Optionally, texting the timestamp information added by the data frame back to the controlling module in the MAC when the timestamp controlling information indicates the necessity of texting-back.

A method of managing IEEE1588 timestamp is provided in an embodiment of the present disclosure. While receiving a data frame, it is not necessary to receive timestamp controlling information, but the storage address of the synchronized timestamp controlling information, which reduces the resources for synchronously penetrating MAC sublayer 2. The timestamp controlling information may be obtained by using the storage address and management of IEEE1588 timestamp by using data frames is possible.

Figure 8:
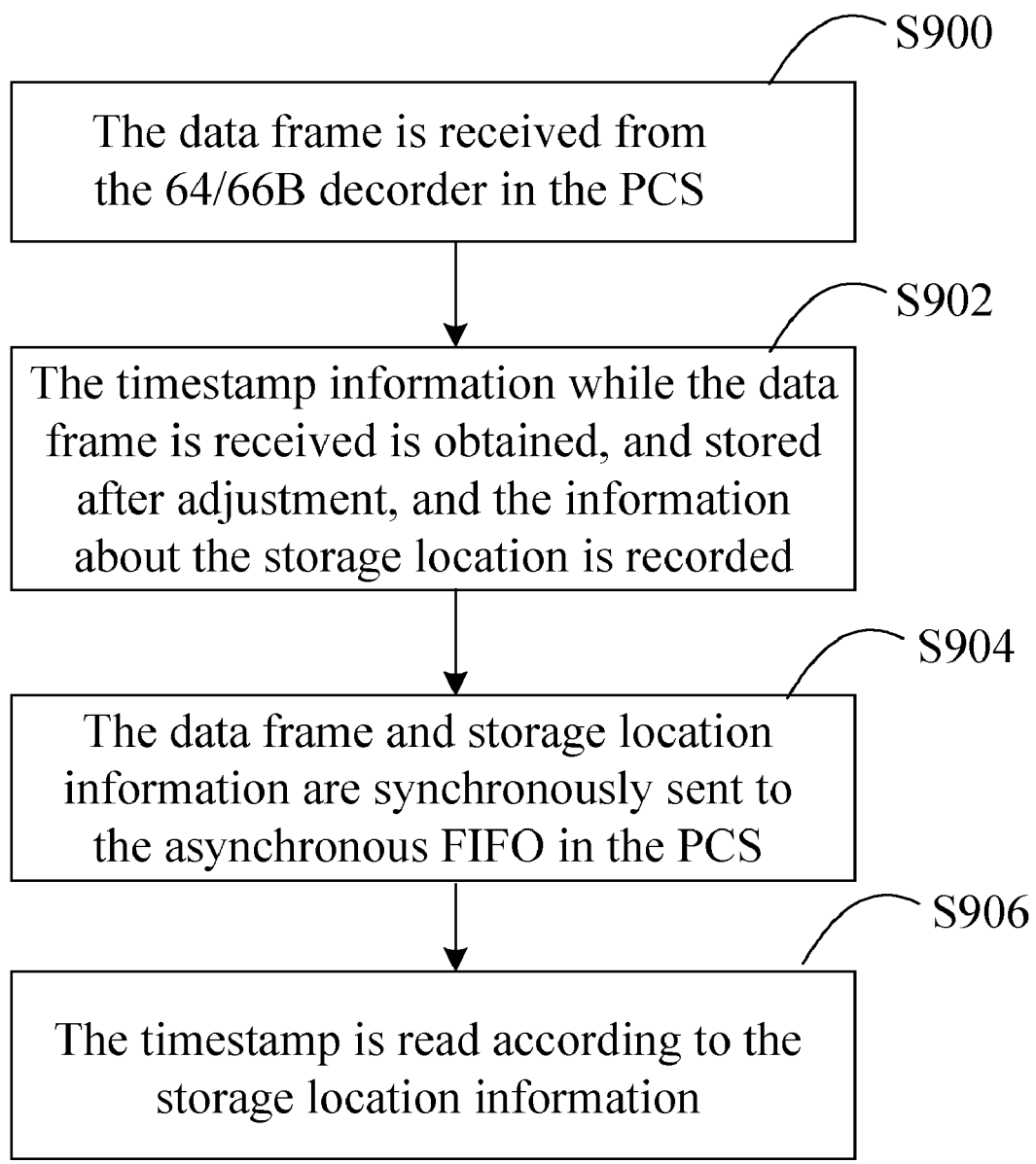
FIG. 8 shows another flowchart of a method of managing IEEE1588 timestamp in an embodiment of the present disclosure.

FIG. 8 shows a flowchart of a method of managing IEEE1588 timestamp in another embodiment of the present disclosure. The flowchart shows that it is possible to obtain IEEE1588 timestamp from the upstream data frame in 10 Gbit/s Ethernet. Specifically, the method includes:

Block S900: Receiving a data frame which, in this embodiment, may be the decoded data frame from 64/66B decoder in PCS; specifically, receiving the data frame through rxdata[63:0] and rxlane[7:0], including 64 bit data and 8 bit controlling information.

Block S902: Receiving and adjusting the timestamp information while receiving the data frame and storing the adjusted timestamp information; specifically, sending a sop indication by pcs_rx_clk (161.133 MHz) clock domain and asynchronously processing it to clk_200m clock domain while judging the start character of the data frame, later locking the timestamp by clk_200m, and then generating writing signals by pcs_rx_clk when the timestamp is stable and recording the timestamp into the storing module; and judging the necessity of adjusting the locked current timestamp and setting adjustment information for the current timestamp, as follows:

judging the address of clock beats while judging the start character of data frame;

obtaining the relevant adjustment value of the range where the clock beats are; specifically, dividing 32 valid clock cycles (32 clock cycles continuously from the start of the first valid clock cycle after 1 invalid clock cycle) into 32 ranges, each of which must be adjusted; wherein the adjustment value increases linearly; the first valid clock cycle has the minimum adjustment value and the $32^{nd}$ valid clock cycle carries the maximum value which is a 161.133 MHz clock cycle; and deducting the adjustment value from the timestamp to obtain the adjusted timestamp, and then storing the timestamp.

Block S904: Synchronously transmitting the data frame and storage address which records and stores the adjusted timestamp information; in this embodiment, transmitting to the asynchronous FIFO in PCS, specifically through rxdata [63:0], rxlane[7:0], and rxtimes_addr[2:0] interfaces.

Block S906: Reading the stored timestamp according to the storage address.

A method of managing IEEE1588 timestamp is provided in an embodiment of the present disclosure. While transmitting data frame, it is not necessary to transmit the timestamp controlling information but the storage address of the timestamp controlling information, which reduces the resources for synchronously penetrating MAC sublayer. The timestamp controlling information may be obtained by using the storage address and management of IEEE1588 timestamp by using data frames is possible.

To sum up, the embodiments of the present disclosure utilize the timestamp controlling information to conveniently and accurately add the timestamp into the data frame while transmitting (or receiving) the data frame, or obtain it from the data frame. Simultaneously, the timestamp and timestamp controlling information are stored in the timestamp storing module. While transmitting the data frame, it is not necessary to transmit timestamp controlling information but the storage address of the timestamp controlling information, which reduces some resources for synchronously penetrating the MAC sublayers. The timestamp controlling information may be obtained by using the storage address and management of IEEE1588 timestamp by using data frames is possible. In addition, the adjustment of the locked timestamp can improve accuracy of adding and obtaining timestamps. For example, the accuracy in one of the embodiments can be controlled in clk_200m clock cycle (e.g. 5 ns).

It is understandable to those skilled in the art that all or part of the steps in the foregoing embodiments may be performed through hardware instructed by a program. The program may be stored in a computer-readable storage medium such as magnetic disk, compact disk, and ROM/RAM.

It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. A method for managing IEEE1588 timestamp, comprising:

receiving a data frame and synchronized storage address of timestamp controlling information;

obtaining timestamp controlling information for the data frame to control the timestamp processing according to the storage address, wherein the timestamp controlling information at least includes adding address indication information for indicating an adding address, and adjustment value indication information for indicating an adjustment value; and obtaining a timestamp when receiving the data frame, obtaining an adjusted timestamp according to the timestamp and the adjustment value indication information, and adding the adjusted timestamp into the data frame according to the adding address indication information in the timestamp controlling information.

2. The method of claim 1, wherein the obtaining a timestamp when receiving the data frame, obtaining an adjusted timestamp according to the timestamp, and adding the adjusted timestamp into the data frame according to the timestamp controlling information comprises:

locking current timestamp information when detecting the start character of the data frame;

judging whether adjustment for the locked current timestamp information is needed;

adjusting the locked current timestamp information to obtain the adjusted timestamp if adjustment for the current timestamp information is needed;

taking the locked current timestamp as the adjusted timestamp if adjustment for the current timestamp information is not needed; and adding the adjusted timestamp into relevant address of the data frame according to the adding address indicated in the timestamp controlling information.

3. The method of claim 2, wherein the adjusting the locked current timestamp information to obtain the adjusted timestamp comprises:

obtaining address of the clock beats sent by a Physical Coding Sublayer (PCS) which sends the data frame while obtaining the locked current timestamp;

obtaining a relevant adjustment value of the location where the clock beats are; and obtaining the adjusted timestamp by adding the adjustment value with the locked current timestamp.

4. A method for managing timestamp, comprising:

receiving a data frame;

obtaining and adjusting a timestamp when receiving the data frame, and storing the adjusted timestamp information; and transmitting synchronously the data frame and the storage address which stores the adjusted timestamp.

5. The method of claim 4, wherein the obtaining a timestamp when receiving the data frame comprises:

locking current timestamp information when detecting the start character of the data frame;

judging whether adjustment for the locked current timestamp information is needed; and adjusting the locked current timestamp information to obtain the adjusted timestamp if adjustment for the current timestamp information is needed; taking the locked current timestamp as the adjusted timestamp if adjustment for the current timestamp information is not needed.

6. The method of claim 5, wherein the adjusting the locked current timestamp information to obtain the adjusted timestamp comprises:

obtaining address of the clock beats sent by a Physical Coding Sublayer (PCS) which sends the data frame while obtaining the locked current timestamp;

obtaining a relevant adjustment value of the location where the clock beats are; and obtaining the adjusted timestamp by deducting the adjustment value from the locked current timestamp.

7. A timestamp managing system, comprising an asynchronous FIFO and a downstream timestamp managing module, adapted to receive data frame and synchronized storage address of timestamp controlling information from the asynchronous FIFO, obtain the timestamp controlling information for the data frame to control the timestamp processing according to the storage address, obtain a timestamp when receiving the data frame, obtain an adjusted timestamp according to the timestamp, and add the adjusted timestamp into the data frame according to the timestamp controlling information, wherein the timestamp controlling information at least includes adding address indication information for indicating an adding address and adjustment value indication information for indicating an adjustment value.

8. The system of claim 7, wherein the downstream timestamp managing module comprises:
an information receiving module, adapted to receive data frame and synchronized storage address of the timestamp controlling information from the asynchronous FIFO;
a timestamp controlling information storage module, adapted to store the timestamp controlling information for the data frame to control the timestamp processing;
a timestamp obtaining module, adapted to obtain a timestamp when receiving the data frame and obtain an adjusted timestamp according to the timestamp; and
a timestamp inserting module, adapted to store the timestamp controlling information according to the relevant timestamp controlling information of its storage address and add the adjusted timestamp obtained by the timestamp obtaining module into the data frame.

9. The system of claim 8, wherein the information receiving module is further adapted to detect the start character of the received data frame.

10. The system of claim 9, wherein the timestamp obtaining module comprises:
a timestamp locking module, adapted to lock current timestamp information when the frame start character detecting module detects the start character of the data frame; and
a timestamp adjusting module, adapted to judge whether adjustment for the locked current timestamp information is needed, adjust the current timestamp information if needed, and obtain the adjusted timestamp.

11. The system of claim 10, wherein the timestamp adjusting module comprises:
a judging module, adapted to obtain an address of the clock beats sent by a Physical Coding Sublayer (PCS) which sends the data frame while obtaining the locked current timestamp;
a determining module, adapted to determine an adjustment value relevant to the data frame according to the address of clock beats judged by the judging module; and
an adjusting module, adapted to adjust the locked current timestamp information according to the adjustment value determined by the determining module and obtain the adjusted timestamp.

12. The system of claim 7, wherein further comprises:
a PCS transmitting module which at least comprises a 64/66B encoding module and a descrambling module.

13. A timestamp managing system, comprising an asynchronous FIFO and an upstream timestamp managing module, adapted to receive a data frame, obtain and adjust a timestamp when receiving the data frame, store the adjusted timestamp, and synchronously transmit the data frame and the storage address which stores the adjusted timestamp.

14. The system of claim 13, wherein the upstream timestamp managing module comprises:
an information receiving module, adapted to receive the data frame;
a timestamp obtaining module, adapted to obtain a timestamp when receiving the data frame and obtain an adjusted timestamp according to the timestamp;
a timestamp storing module, adapted to store the adjusted timestamp from the timestamp obtaining module; and
an information transmitting module, adapted to synchronously transmit the data frame and the storage address which stores the timestamp in the timestamp storing module.

15. The system of claim 14, wherein the information receiving module is further adapted to detect the start character of the received data frame.

16. The system of claim 15, wherein the timestamp obtaining module comprises:
a timestamp locking module, adapted to lock current timestamp information when the frame start character detecting module detects the start character of the data frame; and
a timestamp adjusting module, adapted to judge whether adjustment for the locked current timestamp information is needed, adjust the current timestamp information if needed, and obtain the adjusted timestamp.

17. The system of claim 16, wherein the timestamp adjusting module comprises:
a judging module, adapted to obtaining address of the clock beats sent by a Physical Coding Sublayer (PCS) which sends the data frame while obtaining the locked current timestamp;
a determining module, adapted to determine an adjustment value relevant to the data frame according to the address of clock beats judged by the judging module; and
an adjusting module, adapted to adjust the locked current timestamp information according to the adjustment value determined by the determining module and obtain the adjusted timestamp.

18. The system of claim 13, further comprising:
a PCS receiving module which at least comprises a 64/66B decoding module and a descrambling module.

* * * * *